Patented May 20, 1941

2,242,484

UNITED STATES PATENT OFFICE 2,242,484

STABILIZATION OF RESIN SIRUPS

Paul C. Schroy, Darien, and Raymond P. Hofferbert, Stamford, Conn., assignors to American Cyanamid Company, New York, N. Y., a corporation of Maine No Drawing. Application February 28, 1939, Serial No. 258,952

3 Claims. (Cl. 260—29)

This invention relates to the stabilization of high viscosity aqueous sirups containing resins of the type exemplified by urea-formaldehyde resins. High viscosity aqueous sirups containing resins of the type mentioned above have previously been found to be very unstable upon storage and consequently have had little commercial importance.

High viscosity aqueous sirups of resins such as those mentioned above have been in demand for use in many different types of manufacturing operations such as laminating, finishing of textiles, treatment of paper, etc. Prior to this invention such sirups have not been available with sufficient stability that they could be stored during ordinary manufacturing delays and, therefore, they have not been used to any great extent. Furthermore, such high viscosity sirups as have been available have not been sufficiently stable upon dilution with relatively large volumes of water.

One object of this invention is to provide high viscosity aqueous sirups containing resins of the afore-mentioned type which are stable on storage for sufficient time that they may be used commercially. Another object of the invention is to stabilize such resin sirups so that they may be diluted with relatively large volumes of water without precipitating out.

These and other objects of the invention are attained by adding a water-miscible alcohol to the high viscosity aqueous sirup. Usually it is preferable to add the alcohol to a concentrated sirup. The concentrated sirup may be prepared directly by reacting polymers of formaldehyde such as paraformaldehyde with urea or one of the other nitrogen compounds mentioned above in the presence of sufficient water to give the desired concentration of resin in the resulting sirup. On the other hand the resin sirup may be prepared from aqueous solutions of formaldehyde and subsequently concentrated by evaporation of the water under vacuum. Preferably the concentrated sirups are prepared by refluxing formaldehyde solutions with a nitrogen compound such as urea and/or one of the nitrogen compounds mentioned above.

The following examples of our process are given by way of illustration and not in limitation.

Example 1

1 mol of urea and about 2 mols of formaldehyde (commercial 37% solution) are refluxed at a pH of about 3-6 until a high viscosity is attained e.g. 50 centipoises to 450 centipoises. The sirup is neutralized and analysis shows it to contain about 50% resin. It may then be concentrated under vacuum at about 40° to 50° C. to remove from about 10%-20% of the solvent material. Sufficient ethanol (95%) is then added to make the concentration of the ethanol in the finished sirup about 10%-20%.

Sirups made according to this example without the addition of alcohol, gel when stored at about 40° C. in about one and one half to two months whereas the sirups containing the ethanol are still stable after about five months at the same temperature. The sirups produced according to this procedure are less hydrophobic and may be diluted with as much as 10 parts of water, as compared with the original sirups which may be diluted with only 1-3 parts of water before a hydrophobic resin precipitates out.

Example 2

Example 1 is repeated except that 50% ethanol—50% water is substituted for the 95% ethanol. The resulting sirup is substantially as stable as that produced according to Example 1.

Example 3

About 2 mols of formaldehyde (commercial 37% solution) and 1 mol of urea are refluxed at a pH of about 3-6 until a relatively high viscosity sirup is obtained. After neutralization the sirup is concentrated to a resin content of about 61%. Ethanol (95%) is added until the resin content is about 52%. The resulting sirup shows about the same stability as that made according to Example 1.

Example 4

About 2 mols of paraformaldehyde and 1 mol of urea are reacted in the presence of sufficient water to give the desired concentration, e. g. sufficient to give a concentration of about 60%-70%, to form a high viscosity sirup. Ethanol (95%) is then added to give a sirup of the desired concentration and viscosity. Such sirups show about the same stability as those made according to Examples 1—3.

The stabilized sirups are proportionally more stable at temperatures lower than 40° C. (e. g. 20°-30° C.).

Sirups may be made according to this invention with resin content up to 70%-75% depending upon the initial viscosity of the syrup. In order to prevent gelling before adding the alcohol the syrup must not be too highly concentrated, particularly if the viscosity be relatively high.

Any water miscible alcohol may be used for the purpose of this invention such as methanol, ethanol, isopropanol, secondary butanol, tertiary butanol, etc. When methanol is used, the viscosity drops during storage and where viscous syrups are desired, the other alcohols are generally preferable. Water miscible higher alcohols may also be used but the resulting syrup is less stable and more viscous than those obtained with the alcohols mentioned. They are, however, still more stable than the syrups which do not contain any added alcohol. The alcohol may be either concentrated i. e. up to 100% or it may be dilute. Concentrations of alcohol not lower than about 50% are preferred since more dilute solutions do not give quite as good stability.

While 10%–20% of alcohol is usually sufficient to give good stability, higher concentrations may be used if desirable, e. g. to produce a more dilute sirup. Similarly the sirup may be initially concentrated to a greater or lesser extent than that indicated in the examples above.

In some instances it may be desirable to substitute other nitrogen compounds for part or all of the urea used in the above examples, e. g., thiourea, dicyandiamide, melamine, or mixtures thereof.

The stabilized resin sirups are of particular commercial importance and find application as textile modifiers, for producing permanent finishes, as adhesives e. g. in plywood manufacture, as laminating sirups, in the treatment of paper, etc.

Obviously any modifications in the processes and compositions as described above may be made without departing from the spirit and scope of the invention as defined in the appended claims.

We claim:

1. A process comprising refluxing one mol of urea with about two mols of formaldehyde in aqueous solution at a pH of about 3–6 until a high viscosity sirup with a resin content not over 75% is obtained, said viscosity being between 50 and 450 centipoises, neutralizing the sirup thus formed, removing about 10–20% of the solvent material and adding sufficient ethanol to the concentrated sirup to obtain a concentration of ethanol in the finished product between about 10% and 20%, thereby producing a resinous stable sirup which may be diluted with as much as 10 parts of water without precipitation of the resin.

2. A stable high viscosity sirup which may be diluted with as much as 10 parts of water produced according to the process of claim 1.

3. A process comprising refluxing one mol of urea with two mols of formaldehyde in aqueous solution at a pH of 3–6 until a high viscosity sirup with a resin content of about 50% is obtained, said viscosity being between about 50 and 450 centipoises, neutralizing the sirup thus formed, removing about 10–20% of the solvent material and adding sufficient ethanol to the concentrated sirup to obtain a concentration of ethanol in the finished product between about 10% and 20%, thereby producing a stable resinous sirup which may be diluted with as much as 10 parts of water without precipitation of the resin.

PAUL C. SCHROY.
RAYMOND P. HOFFERBERT.